(12) United States Patent
Limberg et al.

(10) Patent No.: US 10,877,493 B2
(45) Date of Patent: Dec. 29, 2020

(54) MONITORING SYSTEM FOR MONITORING A WATER LEVEL IN A PLUMBING ELEMENT, AND A PLUMBING ELEMENT

(71) Applicant: Grohe AG, Hemer (DE)

(72) Inventors: Dirk Limberg, Bochum (DE); Zhongde Fan, Shanghai (CN)

(73) Assignee: Grohe AG, Hemer (DE)

( * ) Notice: Subject to any disclaimer, the term of this patent is extended or adjusted under 35 U.S.C. 154(b) by 0 days.

(21) Appl. No.: 16/013,337

(22) Filed: Jun. 20, 2018

(65) Prior Publication Data

US 2018/0364743 A1 Dec. 20, 2018

(30) Foreign Application Priority Data

Jun. 20, 2017 (DE) .................. 10 2017 113 544

(51) Int. Cl.
| | |
|---|---|
| *G05D 9/12* | (2006.01) |
| *E03C 1/242* | (2006.01) |
| *G01F 23/16* | (2006.01) |
| *G01F 23/296* | (2006.01) |
| *E03D 11/13* | (2006.01) |
| *E03D 1/36* | (2006.01) |
| *E03C 1/232* | (2006.01) |
| *E03C 1/24* | (2006.01) |

(52) U.S. Cl.
CPC ............ *G05D 9/12* (2013.01); *E03C 1/232* (2013.01); *E03C 1/242* (2013.01); *E03D 1/36* (2013.01); *E03D 11/13* (2013.01); *G01F 23/162* (2013.01); *G01F 23/2962* (2013.01); *E03C 2001/2406* (2013.01)

(58) Field of Classification Search
None
See application file for complete search history.

(56) References Cited

U.S. PATENT DOCUMENTS

| | | | | |
|---|---|---|---|---|
| 4,700,884 | A | * | 10/1987 | Barrett ................ E03B 7/04 126/362.1 |
| 2017/0101766 | A1 | | 4/2017 | Blizzard et al. |
| 2017/0350106 | A1 | * | 12/2017 | Braddock .............. E03C 1/242 |

FOREIGN PATENT DOCUMENTS

| | | |
|---|---|---|
| DE | 28 13 088 A1 | 10/1979 |
| DE | 42 41 023 A1 | 6/1994 |
| DE | 200 13 323 U1 | 1/2002 |
| DE | 20 2004 011 291 U1 | 2/2005 |
| DE | 20 2014 105 549 U1 | 4/2015 |
| DE | 20 2014 002 052 U1 | 7/2015 |
| DE | 10 2014 102 135 A1 | 8/2015 |
| EP | 1 892 340 A1 | 2/2008 |
| EP | 2 759 643 A2 | 7/2014 |
| WO | WO 2007/118791 A2 | 10/2007 |

* cited by examiner

*Primary Examiner* — Hailey K. Do
(74) *Attorney, Agent, or Firm* — Muncy, Geissler, Olds & Lowe, P.C.

(57) ABSTRACT

A monitoring system for monitoring a water level in a plumbing element. The monitoring system has a sensor unit, which includes at least one sensor for detecting a measured value and with the aid of which a water level in a receiving space of the plumbing element may be ascertained. A plumbing element is also provided that comprises a receiving space for accommodating water and at least one water outlet for emptying the water from the receiving space.

8 Claims, 4 Drawing Sheets

MONITORING SYSTEM FOR MONITORING A WATER LEVEL IN A PLUMBING ELEMENT, AND A PLUMBING ELEMENT

This nonprovisional application claims priority under 35 U.S.C. § 119(a) to German Patent Application No. DE 10 2017 113 544.8, which was filed in Germany on Jun. 20, 2017, and which is herein incorporated by reference.

BACKGROUND OF THE INVENTION

Field of the Invention

The present invention relates to a monitoring system for monitoring a water level in a plumbing element. The invention also relates to a plumbing element, which comprises a receiving space for accommodating water and at least one water outlet for emptying the water from the receiving space.

Description of the Background Art

Plumbing elements are known from the prior art, which have an overflow channel for protection against overflow, through which the excess water is removed upon reaching a certain water lever in the plumbing element, so that the water level may be maintained at least at a uniform level.

However, new approaches to overflow protection must be sought when no overflow channel is present on the plumbing element.

SUMMARY OF THE INVENTION

It is therefore an object of the invention to provide a monitoring system for monitoring a water level in a plumbing element as well as a plumbing element.

In an exemplary embodiment, a monitoring system is proposed for monitoring a water level in a plumbing element. The plumbing element may comprise, for example a washbasin, a sink, a shower tub, a bathtub, a toilet and/or a bidet and is therefore disposed in a building, an overflow of the water being avoidable by monitoring the water level.

The monitoring system comprises a sensor unit, which includes at least one sensor for detecting a measured value. A water level in a receiving space of the plumbing element may also be ascertained with the aid of the sensor unit.

A maximum permissible water level furthermore corresponds, for example, to the water level at which the water does not quite overflow out of the plumbing element. For example, the maximum permissible water level is the water level at which a maximum holding capacity of the plumbing element is reached.

However, the maximum permissible water level may also be the water level at which the height of the water is still below a rim of the plumbing element, so that this difference may be used as a safety buffer.

The water level in the receiving space may now be ascertained with the aid of the sensor unit and the sensor, and an overflow of water out of the plumbing element may be prevented, for example, by comparison with the maximum permissible water level.

The water level in the plumbing element may also be measured continuously with the aid of the sensor unit, i.e. any water level in the plumbing element may also be ascertained.

The sensor unit can have a memory, in which at least one parameter of the sensor unit may be stored. The parameter may include, for example, the technical features of the plumbing element. For example, the parameter includes a holding capacity, the maximum permissible water level, a height of a water inlet and/or a depth of the plumbing element. Based on the parameter, the sensor unit may determine whether, for example, the water level presently ascertained in the receiving space has reached the maximum permissible water level. A possible danger of overflow may be ascertained therefrom.

The sensor unit can include an arithmetic unit, with the aid of which the water level in the plumbing element may be ascertained based on the measured value detected by the at least one sensor. Additionally or alternatively, the arithmetic unit may ascertain the water level in the plumbing element based on the at least one parameter stored in the memory. Additionally or alternatively, an exceeding of the maximum permissible water level may also be ascertained. The arithmetic unit may advantageously also calculate the water level.

The monitoring system can include at least on actuator, with the aid of which a water inlet of the plumbing element may be opened and/or closed. Additionally or alternatively, a water outlet of the plumbing element may also be opened and/or closed with the aid of the actuator. For example, if too much water is present in the plumbing element, so that the maximum permissible water level is exceeded, the actuator may close the water inlet, so that no more water flows into the plumbing element. Additionally or alternatively, the actuator may also open the water outlet if there is too much water, so that water flows out of the plumbing element. The water level in the plumbing element may be kept constant or reduced thereby.

Additionally or alternatively, the actuator may also set the water inlet and/or the water outlet in such a way that the water level in the plumbing element drops or is maintained at a level. A certain amount of water flows through the water inlet into the plumbing element, and a certain amount flows out of the plumbing element through the water outlet.

The monitoring system can include a controller connected to the sensor unit. The controller may also be additionally or alternatively connected to the actuator. The controller may furthermore be additionally or alternatively connected to the arithmetic unit. The actuator is controllable by the controller to prevent the plumbing element from overflowing. The controller may advantageously control the actuator in such a way that a maximum permissible water level is not exceeded. For example, the controller may receive a signal from the arithmetic unit, indicating whether and, for example, the extent to which the present water level is above or below the maximum permissible water level. According to this signal, the controller may activate the actuator, which then opens the water outlet, for example if the water level is above the maximum permissible water level, With the aid of the controller, it is, of course, also possible, with the aid of the actuator, to drain water from the receiving space and/or to conduct less water into the receiving space before the maximum water level is reached. For example, the controller may regulate and/or control the water level in the receiving space in such a way that the latter remains 5% below the maximum permissible water level.

The sensor can be a pressure sensor for measuring a water pressure. Moreover, a height of a water column over the pressure sensor may be ascertained from the measured water pressure with the aid of the arithmetic unit. Based on the height of the water column measured by the pressure sensor and at least one parameter of the plumbing element, at least the maximum permissible water level may be ascertained with the aid of the arithmetic unit. The parameter may include, for example, a value which indicates the position at which the pressure sensor is or becomes disposed in the plumbing element. For example, the parameter may include a distance of the pressure sensor from the rim of the plumbing element, so that the height of the water column should not exceed this level. It is thus possible to monitor whether the maximum permissible water level has been reached. Other water levels may furthermore be ascertained with the aid of the pressure sensor. For example, the height of the water level in the plumbing element, from empty to full, may be continuously ascertained with the aid of the pressure sensor, it being possible for a full level to correspond to a maximum permissible water level. The pressure sensor has the advantage that a contamination of the pressure sensor still permits a good pressure measurement, so that it is quite reliable.

To easily ascertain at least the maximum permissible water level, it is advantageous if the sensor is a water level sensor, which may detect at least the maximum permissible water level when it comes in contact with water. Additionally or alternatively, at least the maximum permissible water level may be ascertained from the measured value of the water level sensor with the aid of the arithmetic unit. The water level sensor may include, for example, an electrical contact, which closes an electrical circuit upon contact with water, so that a signal is emitted thereby, which may be evaluated by the arithmetic unit. The arithmetic unit may ascertain from the signal that the water level has reached the water level sensor.

The sensor can be an ultrasonic sensor, which may measure a propagation time of ultrasonic waves between itself and a water surface of the water in the plumbing element. A distance between the ultrasonic sensor and a water surface may be ascertained from this measured value of the propagation time with the aid of the arithmetic unit. Additionally or alternatively, at least the maximum water level may be ascertained from at least one parameter and the distance with the aid of the arithmetic unit. The parameter contains, for example, information on how high above the plumbing element the sensor is disposed. The ultrasonic sensor has the advantage that it may contactlessly measure the distance between itself and the water surface, wherefrom at least the maximum permissible water level is calculated. Damage to the sensor is nearly ruled out due to the contactless measurement. The water level in the plumbing element may also be measured continuously with the aid of the ultrasonic sensor, i.e. water levels between an empty and a full plumbing element (which may correspond to the maximum permissible water level) may also be ascertained, in particular.

The sensor can be a flow sensor, a water through-flow rate and/or a water outflow rate of the plumbing element may be ascertainable. The water through-flow rate and/or the water outflow rate may be ascertained, for example, by the arithmetic unit. The water through-flow rate and/or the water outflow rate indicates, for example, how much water flows into and/or out of the plumbing element in a unit of time. Additionally or alternatively, at least the maximum water level may be ascertained from at least one parameter and the maximum water through-flow rate and/or a water outflow rate with the aid of the arithmetic unit. The arithmetic unit may form, for example, the difference between the water inflow rate and the water outflow rate, the difference corresponding to a water volume which is added to the water volume in the plumbing element per unit of time or which reduces the water volume in the plumbing element per unit of time. If the parameter includes, for example, the maximum possible holding capacity of the plumbing element, it is possible to ascertain therefrom how much water is currently present in the plumbing element, the height of the water in the plumbing element and whether it is overflowing. The maximum permissible water level in the plumbing element may also be calculated from the parameter, if the parameter for the maximum possible holding capacity includes the maximum permissible water level. For example, the water level, i.e. the water level between any empty and a full plumbing element, may also be continuously ascertained with the aid of the water inflow rate and/or the water outflow rate and/or the difference between the water inflow rate and the water outflow rate.

A plumbing element is also proposed, which comprises a receiving space for accommodating water and at least one water outlet for emptying the water from the receiving space. The plumbing element may be, for example, a washbasin, a sink, a shower tub, a bathtub, a toilet and/or a bidet.

The plumbing element can include a monitoring system, which is designed according to one or multiple of the preceding and/or following features of the description.

A water level in the receiving space may thus be monitored with the aid of the monitoring system. This makes it possible to prevent a maximum permissible water level in the receiving space from being exceeded and the plumbing element from overflowing.

The monitoring system can include a controller, which may control and/or regulate the water outlet and/or the water inlet with the aid of an actuator, at least when the maximum permissible water level is exceeded. The actuator may furthermore be additionally or alternatively connected to a sensor unit of the monitoring system, which controls the water outlet and/or the water inlet. The actuator may control the water outlet, for example, in that it at least partially opens a closure disposed in the water outlet. The water may be drained from the receiving space thereby, so that the water level in the receiving space drops or remains at least at a constant level. To open the closure, the actuator may, for example, displace the closure, so that an outlet opening is released, through which the water leaves the receiving space.

The actuator may control and/or regulate the water inlet by at least partially closing a valve disposed in the water inlet. A volume of water flowing into the receiving space is reduced thereby, so that the water level in the receiving space at least does not continue to rise.

The sensor can be disposed in the area of the water outlet. The sensor may also be disposed, for example, on the closure situated in the water outlet. To measure a water column over the sensor and to ascertain the water level therefrom, the sensor may be designed as a pressure sensor. The water outlet of a plumbing element is generally disposed at the lowest point in the receiving space for the purpose of emptying it completely. In this case, the water level in the receiving space corresponds to the water column over the pressure sensor. If the pressure sensor is not disposed at the lowest point in the receiving space, a distance between the lowest point and the pressure sensor must also be added to the water column, so that the water level may be ascertained.

To easily ascertain the water level, the sensor may be disposed on an inside of the receiving space. The sensor may furthermore be designed as a water level sensor. Additionally or alternatively, the sensor may also be disposed higher than the water outlet. The sensor designed as a water level sensor may have, for example, an electrical contact, which closes an electrical circuit when it comes into contact with water. The sensor is disposed, for example, at a height area on the inside of the receiving space, where the water surface of the maximum permissible water level is situated in the receiving space. As a result, the water touches the water level sensor only when the water level has reached the height of the water level sensor.

To contactlessly ascertain the water level, it is advantageous if the sensor is disposed on the water inlet of the plumbing element. For this purpose, the sensor may be designed as an ultrasonic sensor. The sensor may furthermore be disposed on a side of the water inlet facing the receiving space. To ascertain the water level, the ultrasonic sensor emits an ultrasonic signal, which is reflected back to the ultrasonic sensor by the water surface of the water in the receiving space. The ultrasonic sensor measures the propagation time of the ultrasonic signal, so that a distance between the water surface and the sensor may be ascertained therefrom. The water level in the receiving space may be ascertained therefrom with the aid of parameters, such as a height of the ultrasonic above the plumbing element. In particular, the maximum permissible water level in the receiving space may be ascertained therefrom.

The sensor can be a flow sensor, a first flow sensor being disposed in the water inlet. Additionally or alternatively, a second flow sensor may be disposed in the water outlet. The water volume flowing into the receiving space and/or flowing out of the receiving space may be measured with the aid of the flow sensor. The water inflow rate and/or the water outflow rate may thus be measured with the aid of the flow sensor. To calculate the water volume currently present in the receiving space, for example the difference between the water inflow rate and the water outflow rate may be calculated with the aid of the arithmetic unit, so that the water volume and the water level may be extrapolated therefrom. In particular, the maximum permissible water level may be ascertained from the difference, for example if the arithmetic unit compares the difference with the maximum holding capacity of the receiving space.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
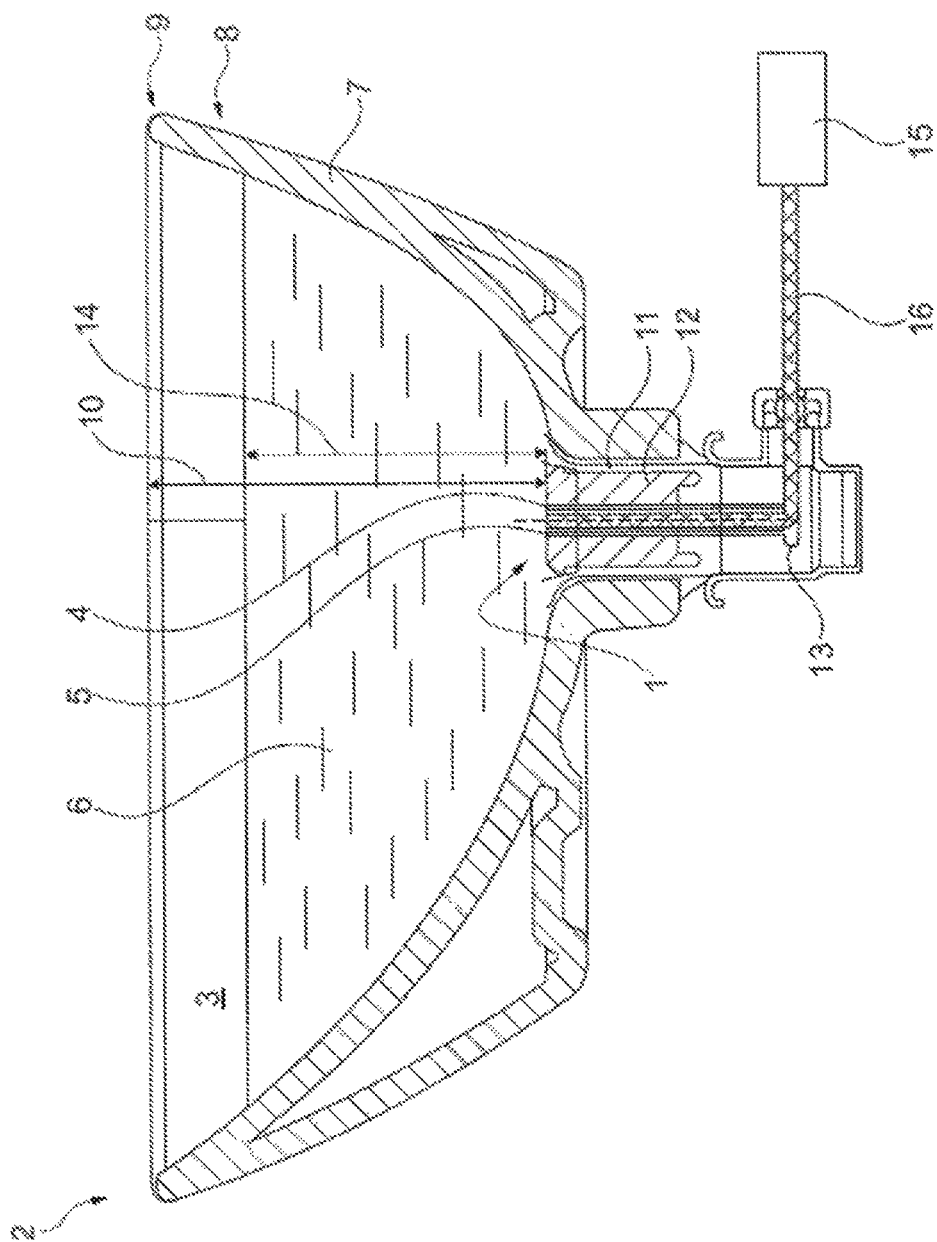
FIG. 1 shows a sectional view of a plumbing element, including a monitoring system which comprises a sensor unit.

FIG. 1 shows a sectional view of a plumbing element 2, including a monitoring system 1 which comprises a sensor unit 4. Plumbing element 2 has a receiving space 3, which may accommodate water 6 and is delimited by a wall 7. Plumbing element 2 is designed as a washbasin in the present exemplary embodiment. Plumbing element 2 may also be designed, for example, as a sink, a shower tub, a bathtub, a toilet and/or a bidet.

To ascertain a water level 8 in receiving space 3, according to the invention monitoring system 1 comprises sensor unit 4, which includes at least one sensor 5 for detecting a measured value. Water level 8 is ascertained to protect against water 6 overflowing out of receiving space 3. According to the exemplary embodiment illustrated in FIG. 1, a maximum permissible water level in receiving space 3 is characterized, for example, in that it comes up to a rim 9 of receiving space 3, so that water 6 does not quite flow out of receiving space 3.

Alternatively, however, the maximum permissible water level of water 6 in receiving space 3 may also be defined by water level 8 in the exemplary embodiment illustrated here. The distance between rim 9 and illustrated water level 8 may be used, for example, as a safety buffer.

To ascertain water level 8 from the measured value measured by sensor 5, sensor unit 4 may have an arithmetic unit.

Moreover, monitoring system 1 may have a memory, in which at least one parameter of plumbing element 2 may be stored. The parameter may be, for example, a holding capacity of receiving space 3, the maximum permissible water level, a height of a water inlet and/or a depth 10 of plumbing element 2.

Plumbing element 2 furthermore includes a water outlet 11, which in the present exemplary embodiment may be closed with the aid of a closure 12. Closure 12 may be opened and closed with the aid of a linkage 13.

According to FIG. 1, sensor 5 of sensor unit 4 is designed as a pressure sensor and in the present exemplary embodiment is disposed in closure 12. Alternatively, the pressure sensor may also be disposed in the area of water outlet 11.

With the aid of the pressure sensor, a water pressure may be measured, which, according to FIG. 1, prevails at the pressure sensor or at closure 12. The arithmetic unit may preferably ascertain from the water pressure the height of a water column over the pressure sensor. If the pressure sensor is disposed at the lowest point in receiving space 3, as illustrated in the present exemplary embodiment, the height of the water column is equal to a water depth 14.

With the aid of a parameter which includes the depth of plumbing element 2, the arithmetic unit may ascertain whether the maximum water level has been reached based on the height of the water column. For example, if the arithmetic unit ascertains that depth 10 of plumbing element 2 and water depth 14 are the same, the arithmetic unit may extrapolate the fact that water 6 has reached rim 9, and water 6 is not yet overflowing.

All other water levels 8 may, of course, also be ascertained with the aid of the pressure sensor. Water depth 14 may be measured continuously by measuring the pressure of water 6 at closure 12.

Monitoring system 1 may also advantageously include a controller 15, which is connected to sensor unit 4 and/or the arithmetic unit via a data line 16. Controller 15 may activate an actuator, which opens closure 12 to avoid the overflow of water 6. The actuator may displace closure 12 upwardly or downwardly with the aid of linkage 13, so that closure 12 releases water outlet 11. As a result, water 6 flows out of receiving space 3 so that water level 8 drops. For example, if water level 8 again drops below the maximum permissible water level, controller 15 may close closure 12 again to prevent water level 8 from dropping any further. Controller 15 may additionally or alternatively activate closure 12 in such a way that water level 8 remains constant, i.e. the amount of water flowing out of receiving space 3 through water outlet 11 is the same as the amount of water flowing into receiving space 3 through a water inlet.

Figure 2:
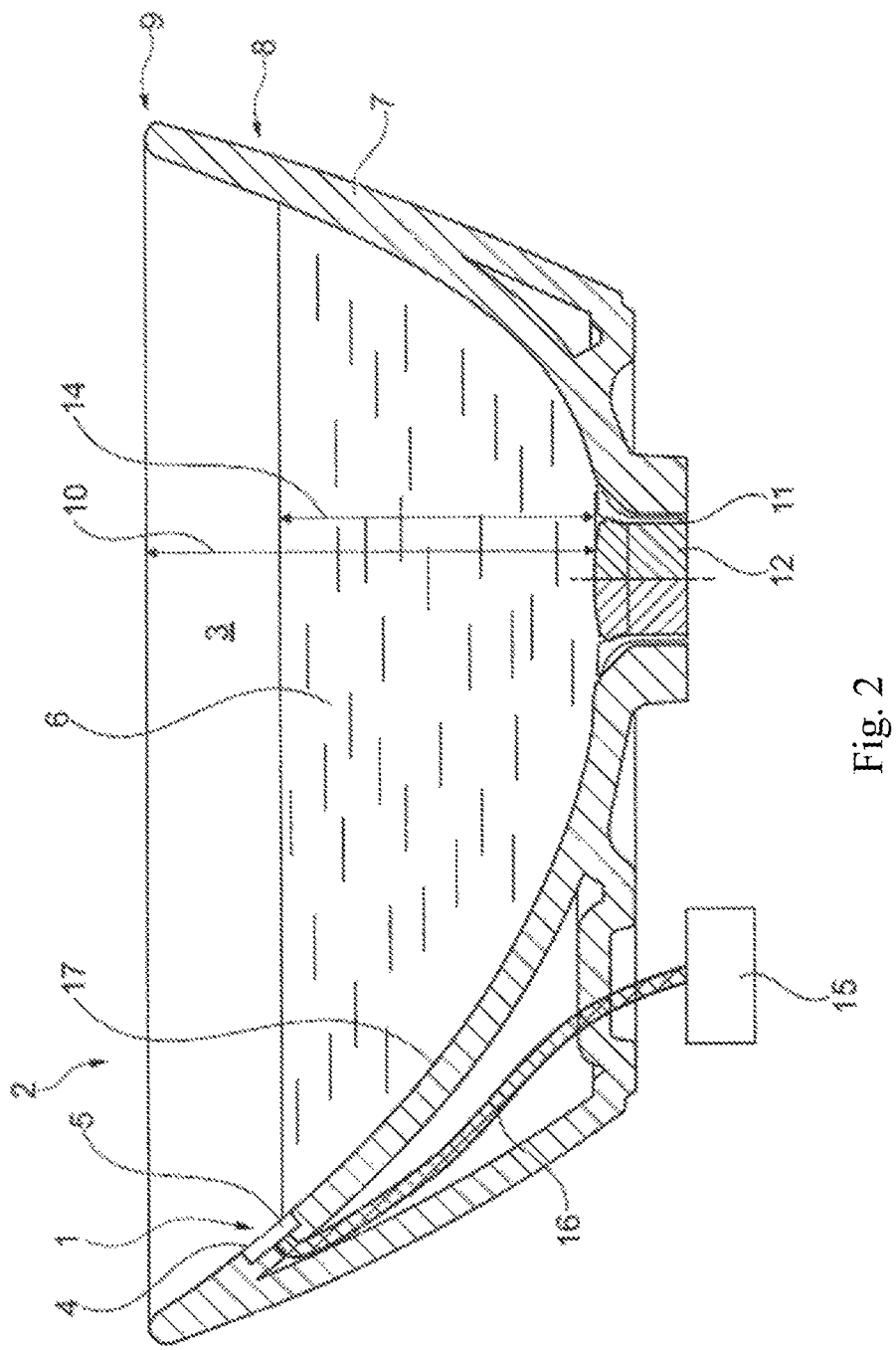
FIG. 2 shows a sectional view of a plumbing element, including a monitoring system.

FIG. 2 shows a sectional view of a plumbing element 2, including a monitoring system 1, in an alternative exemplary embodiment; In this exemplary embodiment, sensor 5 of sensor unit 4 is disposed on an inside 17 of receiving space 3.

Sensor 5 in this exemplary embodiment is designed as a water level sensor, which may measure water level 8 when it comes into contact with water. The water level sensor may have, for example, an electrical contact, which closes an electrical circuit when it comes into contact with water.

A sensor 5 designed as a water level sensor according to FIG. 2 may measure only one water level 8, which, however, may be sufficient to ascertain the maximum permissible water level. Sensor 5 may be disposed at a point on inside 17 of receiving space 3 which corresponds to the maximum permissible water level. According to FIG. 2, for example, sensor 5 is disposed to form another safety buffer up to rim 9.

Alternatively the water level sensor may also be designed in such a way that it may continuously measure water level 8 between an empty and a full receiving space 3. For this purpose, for example, the water level sensor may extend along inside 17 from rim 9 to water outlet 11.

Sensor unit 4 may, for example, also include the arithmetic unit, which ascertains the water level from the measurement of sensor 5. Sensor unit 4 is also connected to controller 15 via a data line 16. Controller 15 may open closure 12 upon reaching the maximum permissible water level, so that water 6 may flow out, and water level 8 drops or at least does not continue to rise. To regulate water level 8, controller 15 may also close a water inlet.

Figure 3:
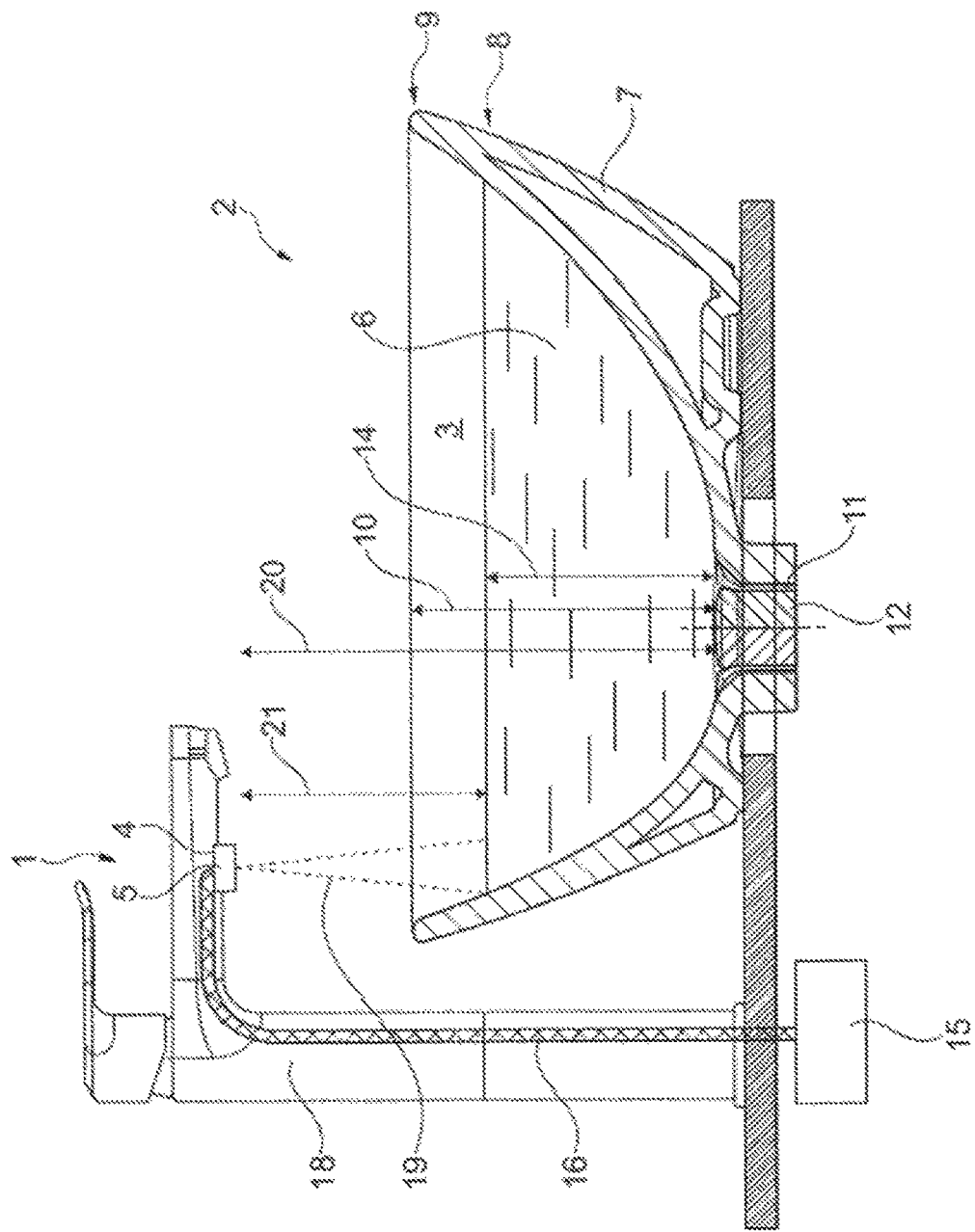
FIG. 3 shows a sectional view of a plumbing element, including a monitoring system.

FIG. 3 shows a sectional view of plumbing element 2, including a monitoring system 1, in another alternative exemplary embodiment; Plumbing element 2, including a water inlet 18, is illustrated in FIG. 3. Water inlet 18 in this case is an inlet faucet, but it may also be a shower head if plumbing element 2 is a shower.

Sensor unit 4, which includes sensor 5, is disposed on an underside of water inlet 18 facing receiving space 3 for the purpose of ascertaining water level 8. Sensor 5 in this case is designed as an ultrasonic sensor, which may transmit ultrasonic waves 19 in the direction of receiving space 3. Ultrasonic waves 19 are reflected back to the ultrasonic sensor on water 6, and they are received by the sensor. For example, the arithmetic unit disposed in sensor unit 4 may ascertain distance 21 between sensor 5 and water 6 from a propagation time of ultrasonic waves 19. The arithmetic unit may ascertain water level 8 based on a parameter stored in the memory and distance 21. The parameter includes, for example height 20 of water inlet 18. Sensor unit 4 and/or arithmetic unit is/are also connected to controller 15 with the aid of data line 16. Controller 15 may control water inlet 18 and/or water outlet 11 with the aid of an actuator, if the maximum permissible water level is exceeded, so that water level 8 drops or at least remains constant.

Figure 4:
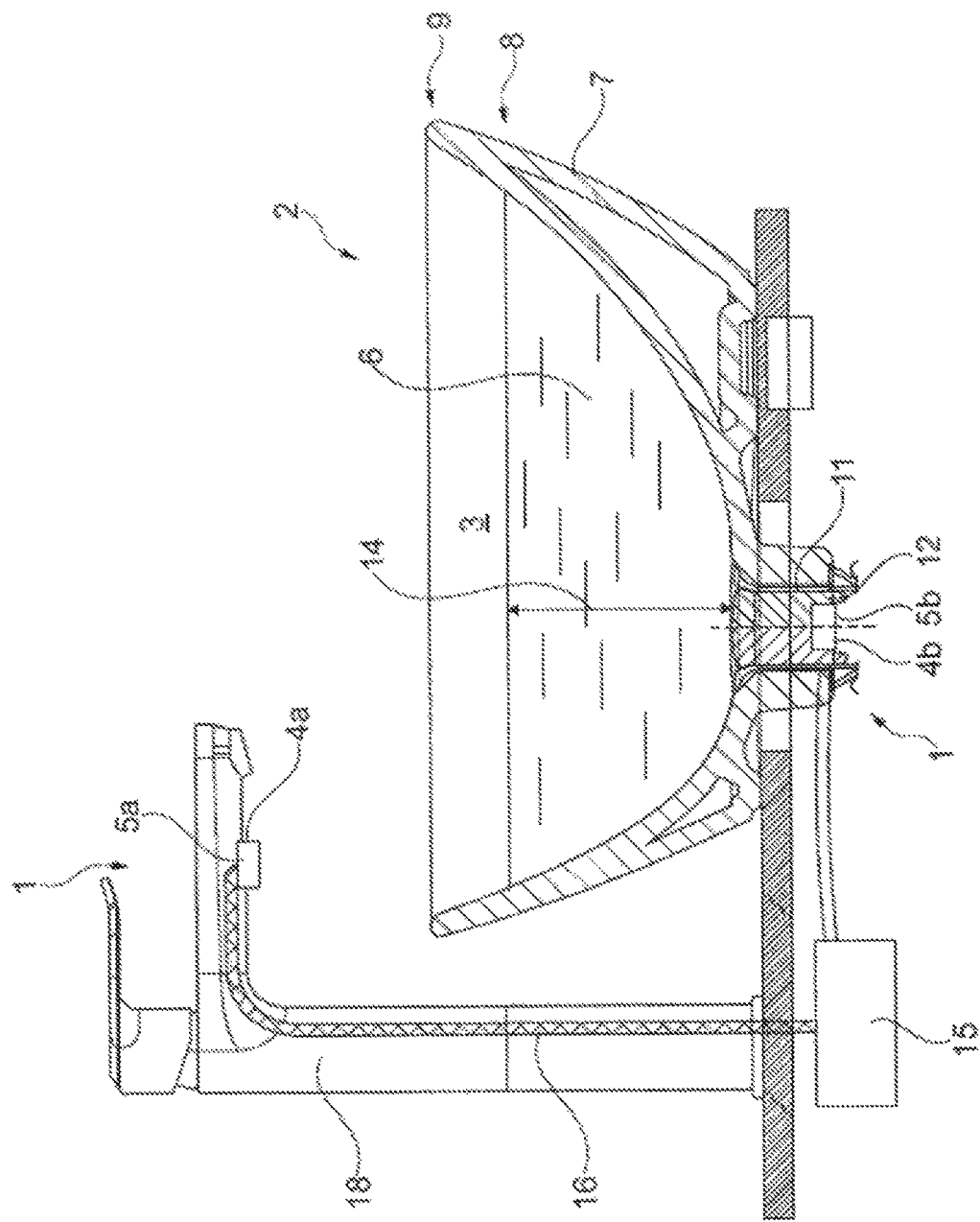
FIG. 4 shows a sectional view of a plumbing element, including a monitoring system.

FIG. 4 shows a sectional view of plumbing element 2, including a monitoring system 1, in another exemplary embodiment. Monitoring system 1 comprises a sensor unit 4a, 4b, divided into two parts, each of which has a sensor 5a, 5b. Monitoring system 1 thus includes two sensors 5a, 5b. In this exemplary embodiment, sensors 5a, 5b are designed as flow sensors, which are able to measure a water through-flow rate.

Sensor 5a is disposed in water inlet 18 and may the water inflow rate flowing into receiving space 3. Sensor 5b is disposed in water outlet 11 and may measure the water outflow rate flowing out of receiving space 3. Water level 8 may be calculated from the water outflow rate and/or the water inflow rate with the aid of the arithmetic unit. Both sensor units 4a, 4b are connected to controller 15, which is also able to ascertain water level 8 based on the measurements of sensors 5a, 5b. For example, controller 15 and/or the arithmetic unit may calculate a difference between the water inflow rate and the water outflow rate, making it possible to ascertain whether as a whole more water 6 is flowing into or out of receiving space 3, or whether the water volume remains constant. The water volume in receiving space 3 may be calculated from this difference and a time measurement. Water level 8, preferably at least the maximum permissible water level, may then be preferably calculated with the aid of a parameter, for example the holding capacity of receiving space 3.

Once the maximum permissible water level has been reached, controller 15 may again control and/or regulate water outlet 11 and/or water inlet 18 in such a way that water 6 is drained and/or less water 6 may flow into receiving space 3.

The present invention is not limited to the illustrated and described exemplary embodiments. Modification within the scope of the patent claims are possible, as is a combination of features, even if they are illustrated and described in different exemplary embodiments.

What is claimed is:

1. A monitoring system for monitoring a water level in a plumbing element, the monitoring system comprising:
    a sensor unit that comprises at least one sensor for detecting a measured value and via which a water level in a receiving space of the plumbing element is ascertained and monitored so as to not exceed a maximum permissible water level,
    wherein the maximum permissible water level corresponds to a maximum holding capacity of the plumbing element without water overflow, such that if the maximum permissible water level were to be exceeded, water would overflow out of the plumbing element,
    wherein the at least one sensor is a pressure sensor,
    wherein a closure is provided in at least one water outlet of the receiving space, the closure being a drain plug that plugs the at least one water outlet when in a closed position, and
    wherein the pressure sensor extends through a central opening of the closure.

2. The monitoring system according to claim 1, wherein the monitoring system has a memory, in which at least one parameter of the plumbing element, including a holding capacity, the maximum permissible water level, a height of a water inlet and/or a depth of the plumbing element, is stored.

3. The monitoring system according to claim 2, wherein the water level in the plumbing element is ascertained or calculated based on the measured value detected by the at least one sensor and/or the at least one parameter stored in the memory.

4. The monitoring system according to claim 3, wherein the at least one sensor is a pressure sensor for measuring a water pressure, wherein a height of a water column over the pressure sensor is ascertained from the measured water pressure, and/or wherein at least the maximum permissible water level is ascertained from the at least one parameter and the water column.

5. The monitoring system according to claim 1, wherein, based on the water level detected in the receiving space, a water inlet and/or the at least one water outlet of the plumbing element is opened, closed and/or set.

6. The monitoring system according to claim 5, wherein the water inlet and/or the at least one water outlet is openable, closeable and/or set so that the maximum permissible water level of the plumbing element is not exceeded.

7. A plumbing element comprising:
a receiving space for accommodating water;
at least one water outlet for emptying the water from the receiving space; and
the monitoring system according to claim 1.

8. The plumbing element according to claim 7, wherein when the maximum permissible water level is exceeded, the closure disposed in the at least one water outlet is at least partially opened, and/or a valve in the water inlet is at least partially closed.

\* \* \* \* \*